United States Patent
Kusaka et al.

[11] Patent Number: 6,069,744
[45] Date of Patent: May 30, 2000

[54] MICROSCOPIC OBJECTIVE HAVING A LONG WORKING DISTANCE

[75] Inventors: Kenichi Kusaka, Sagamihara; Sadashi Adachi; Kentaro Yamazaki, both of Hachioji, all of Japan

[73] Assignee: Olympus Optical Co., Ltd., Tokyo, Japan

[21] Appl. No.: 09/059,465

[22] Filed: Apr. 14, 1998

[30] Foreign Application Priority Data

Apr. 15, 1997 [JP] Japan ................................. 9-097226

[51] Int. Cl.[7] ............................................. G02B 15/14
[52] U.S. Cl. ..................................... 359/692; 359/691
[58] Field of Search .................................. 359/692, 691, 359/693

[56] References Cited

FOREIGN PATENT DOCUMENTS

| | | |
|---|---|---|
| 4-40409 | 2/1992 | Japan . |
| 4-26446 | 5/1992 | Japan . |
| 7-104488 | 11/1995 | Japan . |
| 8-190055 | 7/1996 | Japan . |
| 8-286112 | 11/1996 | Japan . |

*Primary Examiner*—Hung Xuan Dang
*Attorney, Agent, or Firm*—Pillsbury Madison & Sutro, LLP

[57] ABSTRACT

The invention provides a microscope objective having a working distance longer than achieved so far in the prior art even at more than 100 magnifications. The objective comprises a lens group A that comprises a positive meniscus lens concave toward an object side thereof and a plurality of cemented lenses, has positive refractive power and converts light rays from an object to a converging light beam, and a lens group B having negative refractive power, and satisfies condition (1):

$$5 < |f_A/f_B| < 20 \qquad (1)$$

where $f_A$ is a focal length of said lens group A and $f_B$ is a focal length of said lens group B.

22 Claims, 4 Drawing Sheets

MICROSCOPIC OBJECTIVE HAVING A LONG WORKING DISTANCE

BACKGROUND OF THE INVENTION

1. Field of the Invention

The present invention relates generally to an objective having a long working distance, and more particularly to a microscope objective of high magnifications, which has a particularly long working distance.

2. Discussion of Related Art

Objectives for industrial microscopes are now increasingly required to have an ever-longer working distance. For instance, a working distance of at least 3 mm is required to observe a bottom pattern of recesses in an integrated circuit removed from an IC package. When an integrated circuit built on a substrate is observed, a long working distance is needed for the protection of the substrate because inspection of the integrated circuit must be carried out on substrates substrate of irregular shape.

Each year, integrated circuits are designed with ever finer patterns. For this reason, there is a growing demand for objectives capable of greater of than 100X magnification, which are rarely used.

When a dry objective is used to observe images with human eyes, the upper limit on the magnification of the objective is said to be about 100X. Even with greater than 100X, fine patterns may not be observed, because only a blurred image may be seen.

However, this holds only for observation with the naked eye. For recent semiconductor inspection, TVs or image analyses are often used. For these applications, it is required to raise the magnification of an objective so as to obtain the same resolution as in the case of observation with the naked eye, close to the low resolution of the image pickup sensor. When the contrast of a microscopic image is enhanced by image processing, it is possible to observe micro-structures that cannot be viewed with the naked eye.

Objectives having high magnifications and long working distances are known from JP-A's 4-40409, 8-190055 and 8-286112 and JP-B 4-26446. Some available objectives are capable of 250X magnification, but their working distance is about 1 mm at most. This working distance is insufficient for inspection of semiconductors while they are mounted on substrates.

The objective disclosed in JP-B 7-104488 has a working distance of about 15 mm at 100X magnification, which is enough for inspection of semiconductors while they are built on substrates. However, the magnification achieved is barely 100X.

SUMMARY OF THE INVENTION

In view of the aforesaid problems associated with existing microscope objectives, it is an object of the invention to provide an objective having an ever-longer working distance even at greater than 100X magnification.

According to one aspect of the invention, this object is achieved by the provision of an objective having a long working distance, which comprises, in order from an object, a lens group A that comprises a positive meniscus lens concave toward an object side thereof and a plurality of cemented lenses, has positive refractive power and converts light rays from said object to a converging light beam, and a lens group B having negative refractive power, and which satisfies condition (1) given below:

$$5 < |f_A / f_B| < 20 \quad (1)$$

where $f_A$ is a focal length of said lens group A and $f_B$ is a focal length of said lens group B.

Preferably, the objective of the invention further satisfies condition (2) given below:

$$7 < |r_1/(n_1 - 1)|/f \quad (2)$$

where $r_1$ is an object-side radius of curvature of a positive meniscus lens in said lens group A that is located nearest to the object side, $n_1$ is a refractive index of said positive meniscus lens, and f is a focal length of said objective.

According to another aspect of the invention, there is provided an objective having a long working distance, which comprises, in order from an object side thereof, a first lens group that comprises a positive meniscus lens concave toward the object side and a plurality of cemented lenses, has positive refractive power and converts light rays from an object to a converging light beam, a second lens group having negative refractive power and comprising a triplet consisting of a combination of a concave lens, a convex lens and a concave lens, and a third lens group having negative refractive power, and which satisfies condition (2) given below:

$$7 < |r_1/(n_1 - 1)|/f \quad (2)$$

where $r_1$ is an object-side radius of curvature of a positive meniscus lens in said first lens group that is located nearest to said object side, $n_1$ is a refractive index of said positive meniscus lens, and f is a focal length of said objective.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DETAILED DESCRIPTION OF THE PREFERRED EMBODIMENTS

In what follows, a detailed account will be given of why the aforesaid arrangements are used in the invention and how they work.

To increase the working distance of an objective having a constant parfocal length, it is necessary to locate a lens group having positive refractive power on an object side thereof and locate a lens group having strong negative refractive power on an image side thereof. In general, the longer the working distance of an objective, the more rapidly various aberrations become worse. For this type of objective, it is therefore necessary to make correction for various aberrations while the working distance is kept as long as possible.

The objective having a long working distance according to the invention comprises, in order from an object side thereof, a lens group A having positive refractive power and a lens group B having negative refractive power.

The lens group A comprises a positive meniscus lens concave toward the object side and a plurality of cemented lenses, and plays a role in gently converting light rays from an object to a converging light beam. As the working distance becomes longer, the height of the light rays become greater and so it is more difficult to make correction for spherical aberration. To avoid this, it is necessary to locate a positive meniscus lens nearest to an object side of the lens group A, said positive meniscus lens being concave toward the object side of the objective, thereby meeting an aplanatic condition. In addition, since the longer the working distance, the more difficult it is to make correction for chromatic aberrations, it is necessary to make correction for them by locating a plurality of cemented lenses in the lens group A.

The lens group B has strong negative refractive power, and plays a role in allowing the strong negative refractive power to act on the converging light beam upon passing through the lens group A, thereby achieving high magnification. The strong negative refractive power of the lens group B plays another role in reducing Petzval's sum to make good correction for field of curvature.

Condition (1) is provided to define the refractive power relation between the lens groups A and B. When the lower limit of 5 in condition (1) is not reached, the refractive power of the lens group B diminishes and the Petzval's sum of the objective becomes too large to make correction for field of curvature. With the upper limit of 20 in condition (1) exceeded, the refractive power of the lens group B becomes strong and so is favorable for correction of the field of curvature, but difficult-to-correct higher-order aberrations are produced due to some considerable height of light rays passing through the lens group A. In addition, the diameter of the objective becomes impractically large.

Preferably, the microscope objective having a long working distance according to the invention satisfies condition (1)' given below:

$$7<|f_A/f_B|<19 \quad (1)'$$

By satisfying condition (1)' that is a condition to make sure of a longer working distance it is possible to make much better correction for spherical aberration and field of curvature.

Preferably, the microscope objective having a long working distance according to the invention also satisfies condition (2). Condition (2) is provided to define the object-side refractive power of the positive meniscus lens in the lens group A that is located nearest to the object side thereof. For a long working distance microscope objective of more than 100X magnifications, it is desired to satisfy condition (2). Any deviation from the range given by condition (2) causes a deviation from the aplanatic condition, resulting in increases in coma and spherical aberration. Also, any deviation from the range defined by condition (2) gives rise to a decrease in the radius of curvature of the surface located nearest to the object side, which may otherwise render it difficult to make sure of a sufficient working distance.

For the microscope objective having a long working distance according to the invention, it is preferable that the lens group A includes two or more positive single meniscus lenses, each concave toward the object side. By the incorporation of at least two positive single meniscus lenses in the lens group A, it is possible to gradually bend light rays from the object while spherical aberration is substantially inhibited.

It is also preferable that the lens group A includes a triplet consisting of a combination of a convex lens, a concave lens and a convex lens. In a microscope objective having a long working distance, the correction of chromatic aberrations tends to be difficult to achieve. When the lens group A includes at least two positive single meniscus lenses, a triplet having a strong ability to make correction for the chromatic aberrations should be located therein. For the lens group A that has positive refractive power and converts light rays from the object to a converging light beam, it is preferable to bear positive refractive power by locating therein a triplet consisting of the combination of convex, concave and convex lenses and having positive refractive power.

Preferable for the microscope objective having a long working distance according to the invention is that the triplet satisfies condition (3) given below.

$$\nu_T - \nu_O > 25 \quad (3)$$

where $\nu_T$ is an average Abbe's number of the convex lenses in said triplet, and $\nu_O$ is an Abbe's number of the concave lens in said triplet. Any deviation from the range defined by condition (3) renders it impossible to make full correction for the chromatic aberrations of the objective.

For the microscope objective having a long working distance according to the invention, it is preferable that the cemented lens in the lens group B that is located nearest to the object side thereof comprises a triplet consisting of a combination of a concave lens, a convex lens and a concave lens and having negative refractive power. In the microscope objective having a long working distance according to the invention, it is necessary to make correction for chromatic aberrations even by the lens group B because no sufficient correction of chromatic aberration is achievable by the lens group A alone. The lens group B also makes correction for field curvature and coma through its negative refractive power. It is therefore desired to locate the triplet consisting of concave, convex and concave lenses and having negative refractive power nearest to the object side of the lens group B, thereby making correction for the chromatic aberrations, and it is also desired to permit-the triplet to bear negative refractive power, thereby making correction for the field curvature and coma as well.

In the microscope objective having a long working distance according to the invention, it is also desired that at least three triplets be incorporated therein. From a design perspective, an objective makes it more difficult to correct chromatic aberrations with increasing magnification. For an objective having an ultra high magnification as high as 250 magnifications, therefore, it is desired to use at least three triplets for the correction of chromatic aberrations.

The objective having a long working distance according to the invention may be designed as follows.

As already mentioned, the present invention also provides a microscope objective having a long working distance, which comprises, in order from an object side thereof, a first lens group that comprises a positive meniscus lens concave toward the object side and a plurality of cemented lenses, has positive refractive power and converts light rays from an object to a converging light beam, a second lens group having negative refractive power and comprising a triplet consisting of a combination of a concave lens, a convex lens and a concave lens, and a third lens group having negative refractive power, and which satisfies condition (2) given below:

$$7<|r_1/(n_1-1)|/f \qquad (2)$$

where $r_1$ is an object-side radius of curvature of a positive meniscus lens in said first lens group that is located nearest to said object side, $n_1$ is a refractive index of said positive meniscus lens, and f is a focal length of said objective.

This microscope objective having a long working distance comprises, in order an object side thereof, a first lens group having positive refractive power, a second lens group having negative refractive power and a third lens group having negative refractive power.

The first lens group is serves the same purpose as mentioned in connection with the aforesaid lens group A. The first lens group comprises a positive meniscus lens concave toward the object side and a plurality of cemented lenses, and plays a role in gently converting light rays from an object to a converging light beam. The positive meniscus lens in the first lens group that is concave toward the object side of the objective and is located nearest to the object side thereof meets an aplanatic condition. A plurality of cemented lenses are incorporated in the first lens group for the purpose of making correction for chromatic aberrations.

The second lens group has negative refractive power and comprises a triplet of concave, convex and concave lenses. The second and third lens groups, each having negative refractive power, play a role in gradually bending converging light rays passing through the first lens group, thereby obtaining a given magnification. The second lens group also makes correction for a portion of chromatic aberrations that cannot be corrected by the first lens group alone.

The third lens group has negative refractive power, and plays a role in achieving a given magnification. The third lens group also plays a role in making well balanced correction for the field curvature, coma, etc. of the objective.

Condition (2) is provided to define an object-side refractive power of the positive negative meniscus lens in the first lens group that is located nearest to the object side thereof. Any deviation from the range defined by condition (2) gives rise to a devitation from the aplanatic condition, resulting in increases in coma and spherical aberration. Also, any deviation from the range defined by condition (2) renders it impossible to make sure of a sufficient working distance because the radius of curvature of the surface located nearest to the object side becomes small.

In the aforesaid microscope objective having a long working distance, it is desired that at least two positive single meniscus lenses, each concave towards the object side, be incorporated in the first lens group. By the incorporation of at least two positive single meniscus lenses in the first lens group, it is possible to gradually bend light rays from an object while spherical aberration is substantially inhibited.

It is also desired that a triplet consisting of a combination of convex, concave and convex lenses be incorporated in the first lens group. This triplet plays a role in making good correction for chromatic aberrations.

Further, it is desired that the triplet satisfy condition (3) given below:

$$v_T-v_O>25 \qquad (3)$$

where $v_T$ is an average Abbe's number of the convex lenses in said triplet, and $v_O$ is an Abbe's number of the concave lens in said triplet. Any deviation from the range defined by condition (3) renders it impossible to make sufficient correction for chromatic aberrations by this triplet.

In the microscope objective according to the second aspect of the invention, it is desired that the triplet in the second lens group that consist of concave, convex and concave lenses satisfy condition (4) given below:

$$v_{T2}v_{O2}>35 \qquad (4)$$

where $v_{T2}$ is an Abbe's number of the convex lens in said triplet, and $v_{O2}$ is an Abbe's number of the concave lens in said triplet that is located on the object side. Any deviation from the range defined by condition (4) renders it impossible to make sufficient correction for chromatic aberrations by this second lens group.

Furthermore, it is desired that a cemented meniscus lens convex toward the object side be located nearest to the object side of the third lens group. Since light rays incident on the third lens group are converging light rays, it is favorable for correction of aberrations to locate a meniscus lens convex toward the object side nearest to the object side of the third lens group. Also, since the third lens group plays a role in making balanced correction for spherical aberration, chromatic aberrations, coma, etc., it is preferable to use a cemented lens as this meniscus lens.

The aforesaid microscope objectives having a long working distance may be used in combination with measuring microscopes. By the aforesaid microscope objectives having a long working distance, it is possible to achieve high-magnification observation or measurement of samples of irregular shapes.

The aforesaid microscope objective having a long working distance may also be used in combination with semiconductor inspectors. By the aforesaid microscope objectives having a long working distance, it is possible to achieve high-magnification inspection of semiconductors while they are mounted on substrates.

Lens data about each example will be enumerated later. FIGS. 1 to 6 are sectional schematics of lens arrangements according to Examples 1 to 6.

Example 1 represents a design example of an objective of 100X magnification. As can be seen from the sectional schematic of FIG. 1, the lens group A is composed of two positive meniscus lenses, each concave toward an object side of the objective, a triplet consisting of a double-convex lens, a double-concave lens and a double-convex lens, a doublet consisting of a double-convex lens and a double-concave lens, and a double-convex positive single lens. The first lens group G1 is the same as the lens group A. The lens group B is composed of a triplet consisting of a combination of a plano-concave lens, a double-convex lens and a double-concave lens and having negative refractive power, a meniscus doublet consisting of a double-convex lens and a double-concave lens and convex toward the object side, two double-concave negative single lenses, and a doublet consisting of a double-convex lens and a double-concave lens. The triplet in the lens group B constitutes the second lens group G2, and the meniscus doublet convex toward the object side, the two negative single lenses and the doublet constitute the third lens group G3.

Example 2 represents a design example of an objective of 150X magnifications. As can be seen from the sectional schematic of FIG. 2, the lens group A is composed of two positive meniscus lenses, each concave toward an object side of the objective, a triplet consisting of a double-convex lens, a double-concave lens and a double-convex lens, a doublet consisting of a double-convex lens and a negative meniscus lens concave on the object side, and a double-convex positive single lens. The first lens group G1 is the same as the lens group A. The lens group B is composed of a triplet consisting of a combination of a negative meniscus lens concave toward an image side of the objective, a double-convex lens and a double-concave lens, a meniscus doublet consisting of a double-convex lens and a double-concave lens and convex toward the object side, a double-concave negative single lens, and a doublet consisting of a double-convex lens and a double-concave lens. The triplet in the lens group B constitutes the second lens group G2, and the meniscus doublet convex toward the object side, the negative single lens and the doublet constitute the third lens group G3.

Example 3 represents a design example of an objective of 250X magnification. As can be seen from the sectional schematic of FIG. 3, the lens group A is composed of two positive meniscus lenses, each concave toward an object side of the objective, a double-convex positive single lens, a triplet consisting of a combination of a double-convex lens, a double-concave lens and a double-convex lens, a triplet consisting of a combination of a negative meniscus lens concave toward an image side of the objective, a double-convex lens and a negative meniscus lens concave toward the image side, and a doublet consisting of a negative meniscus lens concave toward the image side and a double-convex lens. The lens group B is composed of a meniscus doublet consisting of a double-convex lens and a double-concave lens and convex toward the object side, a double-concave negative single lens, a triplet consisting of a double-convex lens, a double-concave lens and a positive meniscus lens concave toward the image side, a double-concave negative single lens, and a doublet consisting of a double-convex lens and a double-concave lens.

Example 4 represents a design example of an objective of 150X magnification. As can be seen from the sectional schematic of FIG. 4, the lens group A is composed of two positive meniscus lenses, each concave toward an object side of the objective, a double-convex positive single lens, a triplet consisting of a combination of a double-convex lens, a double-concave lens and a double-convex lens, a triplet consisting of a negative meniscus lens concave toward an image side of the objective, a double-convex lens and a negative meniscus lens concave toward the image side, and a doublet consisting of a negative meniscus lens concave toward the image side and a double-convex lens. The lens group B is composed of a meniscus doublet consisting of a double-convex lens and double-concave lens and convex toward the object side, a double-concave negative single lens, a triplet consisting of a double-convex lens, a double-concave lens and a positive meniscus lens concave toward the image side, a double-concave negative single lens, and a doublet consisting of a double-convex lens and a double-concave lens.

Example 5 represents a design example of an objective of 150X magnification. As can be seen from the sectional schematic of FIG. 5, the lens group A is composed of two positive meniscus lenses, each concave toward an object side of the objective, a triplet consisting of a combination of a double-convex lens, a double-concave lens and a double-convex lens, a doublet consisting of a double-convex lens and a negative meniscus lens concave toward the object side, and a double-convex positive single lens. The first lens group G1 is the same as the lens group A. The lens group B is composed of a triplet consisting of a combination of a negative meniscus lens concave toward an image side of the objective, a double-convex lens and a double-concave lens and having negative refractive power, a doublet consisting of a positive meniscus lens concave toward the image side and a negative meniscus lens concave toward the image side and convex toward the object side, a double-concave negative single lens, and a doublet consisting of a double-convex lens and a double-concave lens. The triplet in the lens group B constitutes the second lens group G2, and the doublet convex toward the object side, the negative single lens and the doublet constitute the third lens group G3.

Example 6 represents a design example of an objective of 150X magnification. As can be seen from the sectional schematic of FIG. 6, the lens group A is composed of two positive meniscus lenses, each concave toward an object side of the objective, a triplet consisting of a combination of a double-convex lens, a double-concave lens and a double-convex lens, a doublet consisting of a double-convex lens and a double-concave lens, a double-convex positive single lens, and a doublet consisting of a negative meniscus lens concave toward an image side of the objective and a positive meniscus lens concave toward the image side. The lens group B is composed of a double-concave negative single lens, a doublet consisting of a negative meniscus lens concave toward the image side and a negative meniscus lens concave toward the image side and convex toward the object side, and a triplet consisting of a combination of a double-concave lens, a double-convex lens and a double-concave lens.

Enumerated below are lens data about each example. Symbols used hereinafter but not hereinbefore have the following meanings:

NA: numerical aperture

WD: working distance

β: magnification f: focal length $r_1, r_2$ ... radius of curvature of each lens surface as viewed in order from the object side $d_1, d_2$ ... separation between adjacent lens surfaces as viewed in order from the object side $n_{d1}, n_{d2}$ ... d-line refractive index of each lens as viewed in order from the object side $v_{d1}, v_{d2}$ ... Abbe's number of each lens as viewed in order from the object side

EXAMPLE 1

NA = 0.55,   WD = 15.65,   β = −100,   f = 1.8

| | | | | | | |
|---|---|---|---|---|---|---|
| $r_1$ = | −32.7306 | $d_1$ = | 3.7500 | $n_{d1}$ = 1.88300 | vd1 = 40.78 |
| $r_2$ = | −15.8686 | $d_2$ = | 0.2000 | | |
| $r_3$ = | ∞ | $d_3$ = | 2.9000 | $n_{d2}$ = 1.88300 | $v_{d2}$ = 40.78 |
| $r_4$ = | −40.3819 | $d_4$ = | 0.1925 | | |
| $r_5$ = | 25.9655 | $d_5$ = | 7.6000 | $n_{d3}$ = 1.43875 | $v_{d3}$ = 94.97 |
| $r_6$ = | −24.2497 | $d_6$ = | 2.5000 | $n_{d4}$ = 1.61340 | $v_{d4}$ = 43.84 |
| $r_7$ = | 16.3184 | $d_7$ = | 7.2500 | $n_{d5}$ = 1.43875 | $v_{d5}$ = 94.97 |
| $r_8$ = | −26.8974 | $d_8$ = | 0.1998 | | |
| $r_9$ = | 23.3616 | $d_9$ = | 5.2000 | $n_{d6}$ = 1.43875 | $v_{d6}$ = 94.97 |
| $r_{10}$ = | −22.0208 | $d_{10}$ = | 1.9000 | $n_{d7}$ = 1.65412 | $v_{d7}$ = 39.69 |
| $r_{11}$ = | 66.5977 | $d_{11}$ = | 0.1992 | | |
| $r_{12}$ = | 14.2789 | $d_{12}$ = | 4.5000 | $n_{d8}$ = 1.49700 | $v_{d8}$ = 81.54 |
| $r_{13}$ = | −40.5665 | $d_{13}$ = | 0.5998 | | |
| $r_{14}$ = | ∞ | $d_{14}$ = | 1.4500 | $n_{d9}$ = 1.74000 | $v_{d9}$ = 31.71 |
| $r_{15}$ = | 6.7174 | $d_{15}$ = | 6.3000 | $n_{d10}$ = 1.43875 | $v_{d10}$ = 94.99 |
| $r_{16}$ = | −9.9876 | $d_{16}$ = | 1.0500 | $n_{d11}$ = 1.72047 | $v_{d11}$ = 34.71 |
| $r_{17}$ = | 56.6577 | $d_{17}$ = | 0.4500 | | |
| $r_{18}$ = | 6.2021 | $d_{18}$ = | 3.5000 | $n_{d12}$ = 1.78472 | $v_{d12}$ = 25.71 |
| $r_{19}$ = | −75.0219 | $d_{19}$ = | 1.0000 | $n_{d13}$ = 1.88300 | $v_{d13}$ = 40.78 |
| $r_{20}$ = | 5.2801 | $d_{20}$ = | 4.1064 | | |
| $r_{21}$ = | −11.1868 | $d_{21}$ = | 0.7000 | $n_{d14}$ = 1.51633 | $v_{d14}$ = 64.14 |

-continued

| NA = 0.55, | WD = 15.65, | β = −100, | f = 1.8 |
|---|---|---|---|
| $r_{22}$ = 113.1551 | $d_{22}$ = 3.5361 | | |
| $r_{23}$ = −4.2773 | $d_{23}$ = 0.7000 | $n_{d15}$ = 1.51633 | $ν_{d15}$ = 64.14 |
| $r_{24}$ = 5.1252 | $d_{24}$ = 0.9000 | | |
| $r_{25}$ = 6.3830 | $d_{25}$ = 1.7000 | $n_{d16}$ = 1.78472 | $ν_{d16}$ = 25.71 |
| $r_{26}$ = −9.9448 | $d_{26}$ = 0.7000 | $n_{d17}$ = 1.48749 | $ν_{d17}$ = 70.23 |
| $r_{27}$ = 6.1791 | | | |

(1) $|f_A/f_n|$=8.95
(2) $|r_1/(n_1−1)|/f$=20.6
(3) $ν_T−ν_O$=51.2
(4) $ν_{T2}−ν_{O2}$63.3

EXAMPLE 2

| NA = 0.7, | WD = 7.98, | β = −150, | f = 1.2 |
|---|---|---|---|
| $r_1$ = −16.5034 | $d_1$ = 3.0000 | $n_{d1}$ = 1.83400 | $νd1$ = 37.16 |
| $r_2$ = −9.2834 | $d_2$ = 0.2000 | | |
| $r_3$ = −25.3109 | $d_3$ = 2.7000 | $n_{d2}$ = 1.83400 | $ν_{d2}$ = 37.16 |
| $r_4$ = −16.0649 | $d_4$ = 0.2000 | | |
| $r_5$ = 41.7692 | $d_5$ = 6.4000 | $n_{d3}$ = 1.43875 | $ν_{d3}$ = 94.99 |
| $r_6$ = −14.3661 | $d_6$ = 2.2000 | $n_{d4}$ = 1.61340 | $ν_{d4}$ = 43.84 |
| $r_7$ = 26.0889 | $d_7$ = 6.8000 | $n_{d5}$ = 1.43875 | $ν_{d5}$ = 94.99 |
| $r_8$ = −18.7294 | $d_8$ = 0.2000 | | |
| $r_9$ = 52.4287 | $d_9$ = 6.8000 | $n_{d6}$ = 1.43875 | $ν_{d6}$ = 94.99 |
| $r_{10}$ = −17.2702 | $d_{10}$ = 2.0000 | $n_{d7}$ = 1.61340 | $ν_{d7}$ = 43.84 |
| $r_{11}$ = −347.6269 | $d_{11}$ = 0.2000 | | |
| $r_{12}$ = 22.6857 | $d_{12}$ = 5.2000 | $n_{d8}$ = 1.43875 | $ν_{d8}$ = 94.99 |
| $r_{13}$ = −36.8545 | $d_{13}$ = 0.2000 | | |
| $r_{14}$ = 18.8585 | $d_{14}$ = 1.4000 | $n_{d9}$ = 1.64450 | $ν_{d9}$ = 40.82 |
| $r_{15}$ = 8.5800 | $d_{15}$ = 8.5000 | $n_{d10}$ = 1.43875 | $ν_{d10}$ = 94.99 |
| $r_{16}$ = −19.3649 | $d_{16}$ = 1.1677 | $n_{d11}$ = 1.74000 | $ν_{d11}$ = 31.71 |
| $r_{17}$ = 34.6540 | $d_{17}$ = 3.6022 | | |
| $r_{18}$ = 8.0306 | $d_{18}$ = 6.4427 | $n_{d12}$ = 1.72151 | $ν_{d12}$ = 29.24 |
| $r_{19}$ = −12.4726 | $d_{19}$ = 2.1354 | $n_{d13}$ = 1.76200 | $ν_{d13}$ = 40.10 |
| $r_{20}$ = 3.5169 | $d_{20}$ = 4.8885 | | |
| $r_{21}$ = −5.3104 | $d_{21}$ = 0.5000 | $n_{d14}$ = 1.51633 | $ν_{d14}$ = 64.14 |
| $r_{22}$ = 3.2932 | $d_{22}$ = 2.8505 | | |
| $r_{23}$ = 4.0956 | $d_{23}$ = 2.0000 | $n_{d15}$ = 1.64769 | $ν_{d15}$ = 33.79 |
| $r_{24}$ = −2.7982 | $d_{24}$ = 0.5000 | $n_{d16}$ = 1.74320 | $ν_{d16}$ = 49.34 |
| $r_{25}$ = 6.5000 | | | |

(1) $|f_A/f_B|$=5.2
(2) $|r_1/(n_1−1)|/f$=16.5
(3) $ν_T−ν_O$=51.2
(4) $ν_{T2}−ν_{O2}$=54.2

EXAMPLE 3

| NA = 0.8, | WD = 6, | β = −250, | f = 0.72 |
|---|---|---|---|
| $r_1$ = −13.5691 | $d_1$ = 2.9917 | $n_{d1}$ = 1.88300 | $νd1$ = 40.76 |
| $r_2$ = −8.9845 | $d_2$ = 0.3481 | | |
| $r_3$ = −27.4726 | $d_3$ = 3.5646 | $n_{d2}$ = 1.56907 | $ν_{d2}$ = 71.30 |
| $r_4$ = −13.6085 | $d_4$ = 0.2400 | | |
| $r_5$ = 158.2936 | $d_5$ = 3.9778 | $n_{d3}$ = 1.56907 | $ν_{d3}$ = 71.30 |
| $r_6$ = −27.5994 | $d_6$ = 0.1788 | | |
| $r_7$ = 23.7183 | $d_7$ = 6.9297 | $n_{d4}$ = 1.43875 | $ν_{d4}$ = 94.99 |
| $r_8$ = −21.7432 | $d_8$ = 1.9449 | $n_{d5}$ = 1.61340 | $ν_{d5}$ = 43.84 |
| $r_9$ = 20.4975 | $d_9$ = 5.9468 | $n_{d6}$ = 1.43875 | $ν_{d6}$ = 94.99 |
| $r_{10}$ = −30.3386 | $d_{10}$ = 0.3368 | | |
| $r_{11}$ = 28.0652 | $d_{11}$ = 1.6557 | $n_{d7}$ = 1.61340 | $ν_{d7}$ = 43.84 |
| $r_{12}$ = 10.0304 | $d_{12}$ = 10.9710 | $n_{d8}$ = 1.43875 | $ν_{d8}$ = 94.99 |
| $r_{13}$ = −12.6854 | $d_{13}$ = 1.1777 | $n_{d9}$ = 1.61340 | $ν_{d9}$ = 43.84 |
| $r_{14}$ = −66.1818 | $d_{14}$ = 0.2005 | | |

-continued

| NA = 0.8, | WD = 6, | β = −250, | f = 0.72 |
|---|---|---|---|
| $r_{15}$ = 16.8332 | $d_{15}$ = 2.6912 | $n_{d10}$ = 1.61340 | $ν_{d10}$ = 43.84 |
| $r_{16}$ = 10.2358 | $d_{16}$ = 6.0075 | $n_{d11}$ = 1.43875 | $ν_{d11}$ = 94.99 |
| $r_{17}$ = −16.8186 | $d_{17}$ = 0.2174 | | |
| $r_{18}$ = 9.1196 | $d_{18}$ = 3.4847 | $n_{d12}$ = 1.43875 | $ν_{d12}$ = 94.99 |
| $r_{19}$ = −18.3504 | $d_{19}$ = 0.9859 | $n_{d13}$ = 1.71850 | $ν_{d13}$ = 33.52 |
| $r_{20}$ = 12.3214 | $d_{20}$ = 1.4988 | | |
| $r_{21}$ = −10.6834 | $d_{21}$ = 1.2828 | $n_{d14}$ = 1.64450 | $ν_{d14}$ = 40.82 |
| $r_{22}$ = 16.3670 | $d_{22}$ = 3.1932 | | |
| $r_{23}$ = 6.0551 | $d_{23}$ = 1.4142 | $n_{d15}$ = 1.80518 | $ν_{d15}$ = 25.42 |
| $r_{24}$ = −11.5680 | $d_{24}$ = 0.9701 | $n_{d16}$ = 1.67790 | $ν_{d16}$ = 55.34 |
| $r_{25}$ = 2.2230 | $d_{25}$ = 1.4631 | $n_{d17}$ = 1.74000 | $ν_{d17}$ = 31.71 |
| $r_{26}$ = 5.6395 | $d_{26}$ = 1.8576 | | |
| $r_{27}$ = −3.1922 | $d_{27}$ = 0.9608 | $n_{d18}$ = 1.88300 | $ν_{d18}$ = 40.76 |
| $r_{28}$ = 3.8840 | $d_{28}$ = 0.4526 | | |
| $r_{29}$ = 2.7758 | $d_{29}$ = 1.1860 | $n_{d19}$ = 1.60342 | $ν_{d19}$ = 38.03 |
| $r_{30}$ = −2.7070 | $d_{30}$ = 0.6747 | $n_{d20}$ = 1.67790 | $ν_{d20}$ = 55.34 |
| $r_{31}$ = 4.2382 | | | |

(1) $|F_A/f_B|$=17.4
(2) $|r_1/(n_1−1)|/f$=21.3
(3) $ν_T−ν_O$=51.2

EXAMPLE 4

| NA = 0.7, | WD = 9, | β = −150, | f = 1.2 |
|---|---|---|---|
| $r_1$ = −15.5119 | $d_1$ = 2.7769 | $n_{d1}$ = 1.88300 | $νd1$ = 40.76 |
| $r_2$ = −10.8342 | $d_2$ = 0.1333 | | |
| $r_3$ = −100.2156 | $d_3$ = 3.6884 | $n_{d2}$ = 1.56907 | $νd_2$ = 71.30 |
| $r_4$ = −18.6951 | $d_4$ = 0.2416 | | |
| $r_5$ = 51.8287 | $d_5$ = 4.1923 | $n_{d3}$ = 1.56907 | $ν_{d3}$ = 71.30 |
| $r_6$ = −42.9409 | $d_6$ = 0.2726 | | |
| $r_7$ = 32.3803 | $d_7$ = 7.0161 | $n_{d4}$ = 1.56907 | $ν_{d4}$ = 71.30 |
| $r_8$ = −21.9151 | $d_8$ = 2.0300 | $n_{d5}$ = 1.61340 | $ν_{d5}$ = 43.84 |
| $r_9$ = 12.4221 | $d_9$ = 7.0271 | $n_{d6}$ = 1.43875 | $νd_6$ = 94.99 |
| $r_{10}$ = −41.5623 | $d_{10}$ = 0.2893 | | |
| $r_{11}$ = 40.1665 | $d_{11}$ = 1.7213 | $n_{d7}$ = 1.61340 | $ν_{d7}$ = 43.84 |
| $r_{12}$ = 10.7165 | $d_{12}$ = 11.0211 | $n_{d8}$ = 1.43875 | $ν_{d8}$ = 94.99 |
| $r_{13}$ = −10.7326 | $d_{13}$ = 1.2471 | $n_{d9}$ = 1.61340 | $ν_{d9}$ = 43.84 |
| $r_{14}$ = −71.7490 | $d_{14}$ = 0.3020 | | |
| $r_{15}$ = 12.5961 | $d_{15}$ = 1.9760 | $n_{d10}$ = 1.61340 | $ν_{d10}$ = 43.84 |
| $r_{16}$ = 7.8203 | $d_{16}$ = 6.0777 | $n_{d11}$ = 1.43875 | $ν_{d11}$ = 94.99 |
| $r_{17}$ = −15.4379 | $d_{17}$ = 0.0929 | | |
| $r_{18}$ = 8.4060 | $d_{18}$ = 3.2331 | $n_{d12}$ = 1.43875 | $ν_{d12}$ = 94.99 |
| $r_{19}$ = −20.4563 | $d_{19}$ = 0.9458 | $n_{d13}$ = 1.71850 | $ν_{d13}$ = 33.52 |
| $r_{20}$ = 7.9395 | $d_{20}$ = 1.3405 | | |
| $r_{21}$ = −10.3325 | $d_{21}$ = 1.4415 | $n_{d14}$ = 1.64450 | $ν_{d14}$ = 40.82 |
| $r_{22}$ = 17.5755 | $d_{22}$ = 1.1847 | | |
| $r_{23}$ = 9.6049 | $d_{23}$ = 1.6779 | $n_{d15}$ = 1.80518 | $ν_{d15}$ = 25.42 |
| $r_{24}$ = −5.9121 | $d_{24}$ = 1.1003 | $n_{d16}$ = 1.67790 | $ν_{d16}$ = 55.34 |
| $r_{25}$ = 3.0804 | $d_{25}$ = 1.5266 | $n_{d17}$ = 1.74000 | $ν_{d17}$ = 31.71 |
| $r_{26}$ = 7.8718 | $d_{26}$ = 2.0053 | | |
| $r_{27}$ = −3.3995 | $d_{27}$ = 0.7465 | $n_{d18}$ = 1.88300 | $ν_{d18}$ = 40.76 |
| $r_{28}$ = 4.8217 | $d_{28}$ = 0.4364 | | |
| $r_{29}$ = 5.0498 | $d_{29}$ = 0.9055 | $n_{d19}$ = 1.75520 | $ν_{d19}$ = 27.51 |
| $r_{30}$ = −4.2878 | $d_{30}$ = 0.3860 | $n_{d20}$ = 1.56384 | $ν_{d20}$ = 60.67 |
| $r_{31}$ = 9.9620 | | | |

(1) $|f_A/f_B|$=17
(2) $|r_1/(n_1−1)|/f$=14.6
(3) $ν_T−ν_O$=39.3

EXAMPLE 5

| NA = 0.65, | WD = 8, | β = −150, | f = 1.2 |
|---|---|---|---|
| $r_1$ = −8.0159 | $d_1$ = 3.0000 | $n_{d1}$ = 1.83400 | vd1 = 37.16 |
| $r_2$ = −7.1454 | $d_2$ = 0.2000 | | |
| $r_3$ = −40.5426 | $d_3$ = 2.7000 | $n_{d2}$ = 1.83400 | $v_{d2}$ = 37.16 |
| $r_4$ = −20.0956 | $d_4$ = 0.2000 | | |
| $r_5$ = 22.8457 | $d_5$ = 6.4000 | $n_{d3}$ = 1.43875 | $v_{d3}$ = 94.99 |
| $r_6$ = −21.9873 | $d_6$ = 2.2000 | $n_{d4}$ = 1.61340 | $v_{d4}$ = 43.84 |
| $r_7$ = 25.7160 | $d_7$ = 6.8000 | $n_{d5}$ = 1.43875 | $vd_5$ = 94.99 |
| $r_8$ = −20.2299 | $d_8$ = 0.2000 | | |
| $r_9$ = 39.5687 | $d_9$ = 6.8000 | $n_{d6}$ = 1.43875 | $v_{d6}$ = 94.99 |
| $r_{10}$ = −15.2716 | $d_{10}$ = 2.0000 | $n_{d7}$ = 1.61340 | $v_{d7}$ = 43.84 |
| $r_{11}$ = −279.5065 | $d_{11}$ = 0.2000 | | |
| $r_{12}$ = 15.3915 | $d_{12}$ = 5.2000 | $n_{d8}$ = 1.43875 | $v_{d8}$ = 94.99 |
| $r_{13}$ = −405.4120 | $d_{13}$ = 0.2000 | | |
| $r_{14}$ = 18.6208 | $d_{14}$ = 1.4000 | $n_{d9}$ = 1.71850 | $v_{d9}$ = 33.52 |
| $r_{15}$ = 7.2754 | $d_{15}$ = 8.5000 | $n_{d10}$ = 1.43875 | $v_{d10}$ = 94.99 |
| $r_{16}$ = −12.6963 | $d_{16}$ = 1.2645 | $n_{d11}$ = 1.74000 | $v_{d11}$ = 31.71 |
| $r_{17}$ = 18.8951 | $d_{17}$ = 3.6928 | | |
| $r_{18}$ = 7.5299 | $d_{18}$ = 6.4929 | $n_{d12}$ = 1.84666 | $v_{d12}$ = 23.78 |
| $r_{19}$ = 9.2424 | $d_{19}$ = 2.3538 | $n_{d13}$ = 1.83481 | $v_{d13}$ = 42.72 |
| $r_{20}$ = 3.8580 | $d_{20}$ = 4.6383 | | |
| $r_{21}$ = −6.3325 | $d_{21}$ = 0.5000 | $n_{d14}$ = 1.51633 | $v_{d14}$ = 64.14 |
| $r_{22}$ = 3.5370 | $d_{22}$ = 2.9474 | | |
| $r_{23}$ = 3.9682 | $d_{23}$ = 2.0000 | $n_{d15}$ = 1.64769 | $v_{d15}$ = 33.79 |
| $r_{24}$ = −2.3996 | $d_{24}$ = 0.5000 | $n_{d16}$ = 1.74320 | $v_{d16}$ = 49.34 |
| $r_{25}$ = 6.5000 | | | |

(1) $|f_A/f_B|$ = 5.31
(2) $|r_1/(n_1-1)|/f = 8$
(3) $v_T - v_O = 51.2$
(4) $v_{T2} - v_{O2} = 61.5$

EXAMPLE 6

| NA = 0.6, | WD = 11.5, | β = −150, | f = 1.2 |
|---|---|---|---|
| $r_1$ = −27.2302 | $d_1$ = 3.3000 | $n_{d1}$ = 1.83400 | vd1 = 37.16 |
| $r_2$ = −12.9167 | $d_2$ = 0.2000 | | |
| $r_3$ = −52.0182 | $d_3$ = 2.7000 | $n_{d2}$ = 1.83400 | $v_{d2}$ = 37.16 |
| $r_4$ = −27.9035 | $d_4$ = 0.2000 | | |
| $r_5$ = 21.7292 | $d_5$ = 7.2000 | $n_{d3}$ = 1.43875 | $v_{d3}$ = 94.99 |
| $r_6$ = −23.4390 | $d_6$ = 2.2000 | $n_{d4}$ = 1.61340 | $v_{d4}$ = 43.84 |
| $r_7$ = 19.3544 | $d_7$ = 7.1000 | $n_{d5}$ = 1.43875 | $v_{d5}$ = 94.99 |
| $r_8$ = −20.5622 | $d_8$ = 0.2000 | | |
| $r_9$ = 29.5832 | $d_9$ = 6.5000 | $n_{d6}$ = 1.43875 | $v_{d6}$ = 94.99 |
| $r_{10}$ = −14.6507 | $d_{10}$ = 1.5000 | $n_{d7}$ = 1.61340 | $v_{d7}$ = 43.84 |
| $r_{11}$ = 39.4909 | $d_{11}$ = 0.2000 | | |
| $r_{12}$ = 10.9328 | $d_{12}$ = 6.0000 | $n_{d8}$ = 1.43875 | $v_{d8}$ = 94.99 |
| $r_{13}$ = −313.8411 | $d_{13}$ = 0.2000 | | |
| $r_{14}$ = 16.1692 | $d_{14}$ = 1.5000 | $n_{d9}$ = 1.61340 | $v_{d9}$ = 43.84 |
| $r_{15}$ = 5.9215 | $d_{15}$ = 5.4000 | $n_{d10}$ = 1.43875 | $v_{d10}$ = 94.99 |
| $r_{16}$ = 319.9092 | $d_{16}$ = 1.5023 | | |
| $r_{17}$ = −8.4854 | $d_{17}$ = 0.9946 | $n_{d11}$ = 1.71850 | $v_{d11}$ = 33.52 |
| $r_{18}$ = 95.8225 | $d_{18}$ = 1.7922 | | |
| $r_{19}$ = 6.7305 | $d_{19}$ = 7.5471 | $n_{d12}$ = 1.76182 | $v_{d12}$ = 26.52 |
| $r_{20}$ = 6.0000 | $d_{20}$ = 2.1176 | $n_{d13}$ = 1.87400 | $v_{d13}$ = 35.26 |
| $r_{21}$ = 2.1023 | $d_{21}$ = 5.3531 | | |
| $r_{22}$ = −9.3403 | $d_{22}$ = 0.5000 | $n_{d14}$ = 1.64450 | $v_{d14}$ = 40.82 |
| $r_{23}$ = 2.8474 | $d_{23}$ = 2.0000 | $n_{d15}$ = 1.78472 | $v_{d15}$ = 25.68 |
| $r_{24}$ = −5.8863 | $d_{24}$ = 0.5000 | $n_{d16}$ = 1.78800 | $v_{d16}$ = 47.37 |
| $r_{25}$ = 13.6533 | | | |

(1) $|f_A/f_B|$ = 8.81
(2) $|r_1/(n_1-1)|/f = 27.2$
(3) $v_T - v_O = 51.2$

Figure 1:
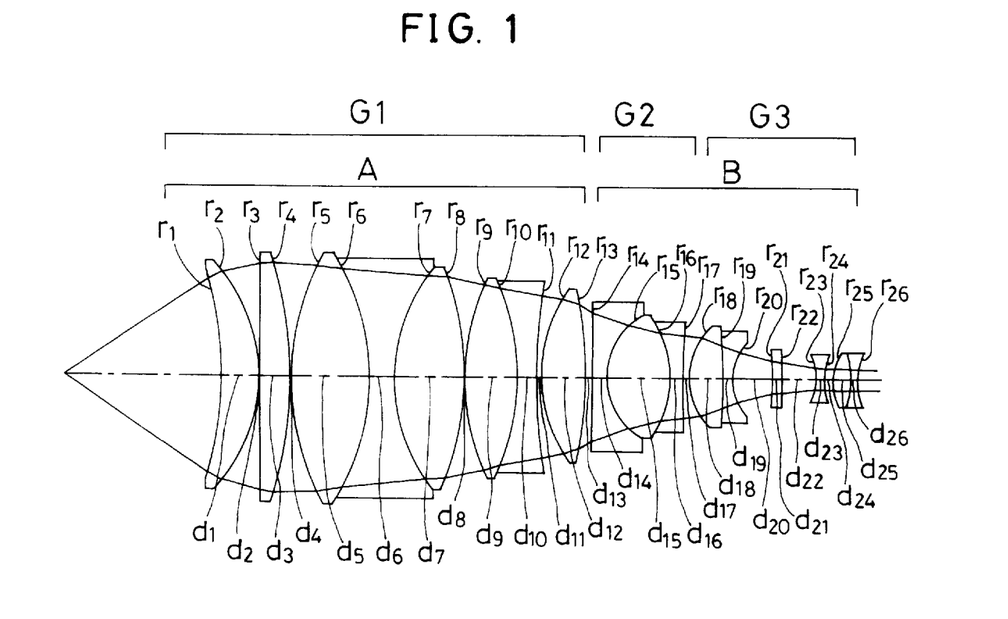
FIG. 1 is a sectional schematic of Example 1 of the microscope object according to the invention.
Figure 2:
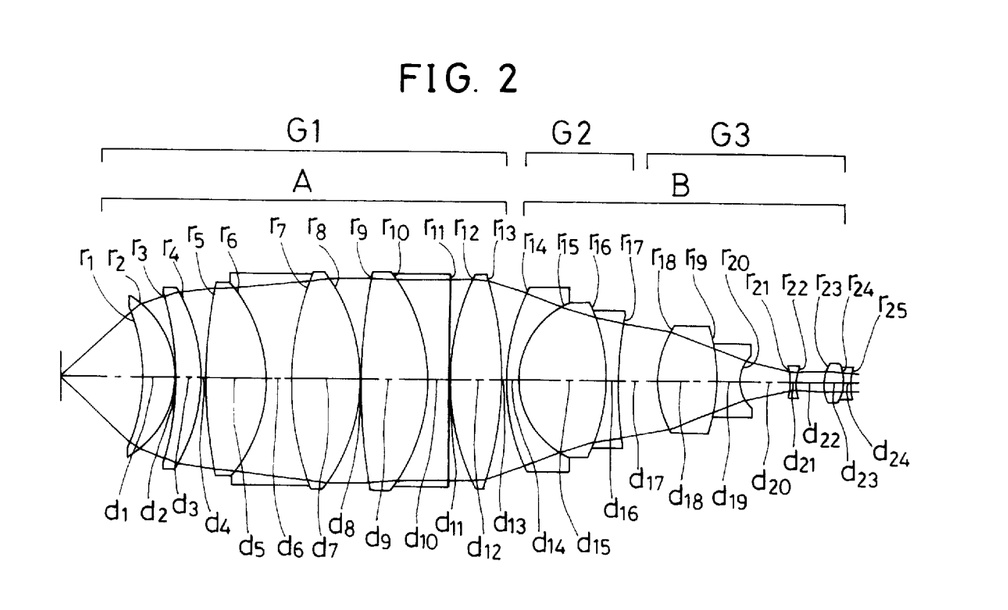
FIG. 2 is a sectional schematic of Example 2 of the microscope object according to the invention.
Figure 3:
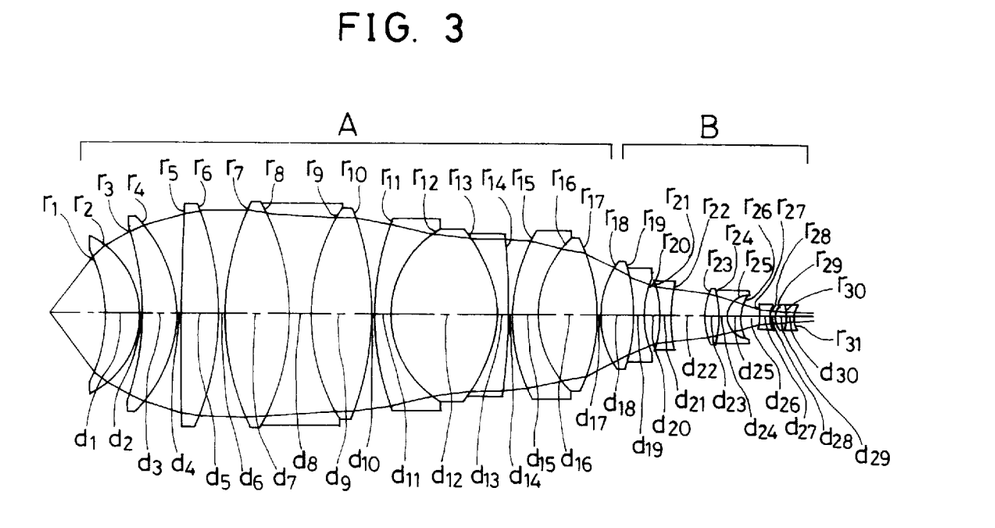
FIG. 3 is a sectional schematic of Example 3 of the microscope object according to the invention.
Figure 4:
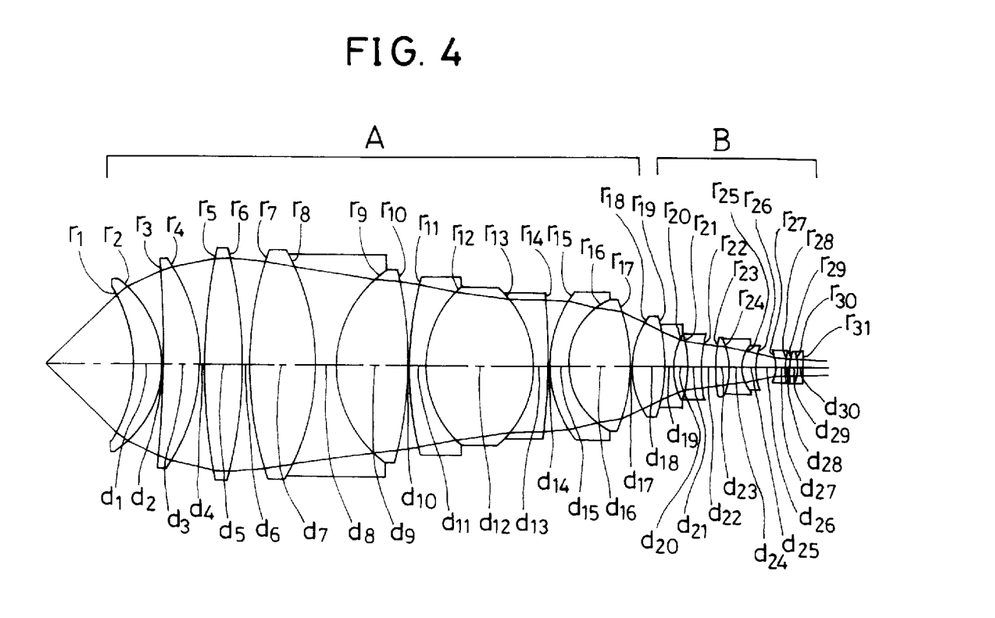
FIG. 4 is a sectional schematic of Example 4 of the microscope object according to the invention.
Figure 5:
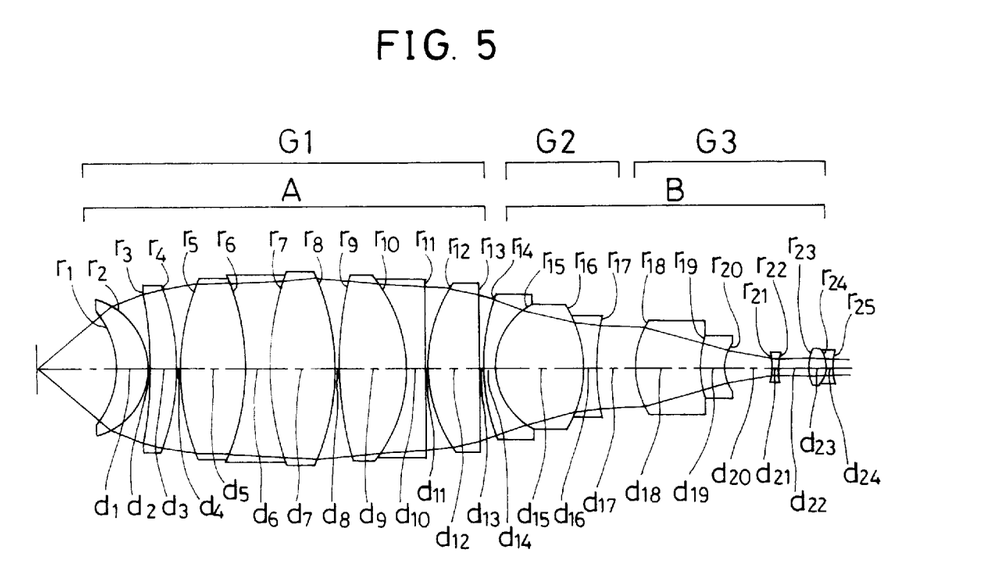
FIG. 5 is a sectional schematic of Example 5 of the microscope object according to the invention.
Figure 6:
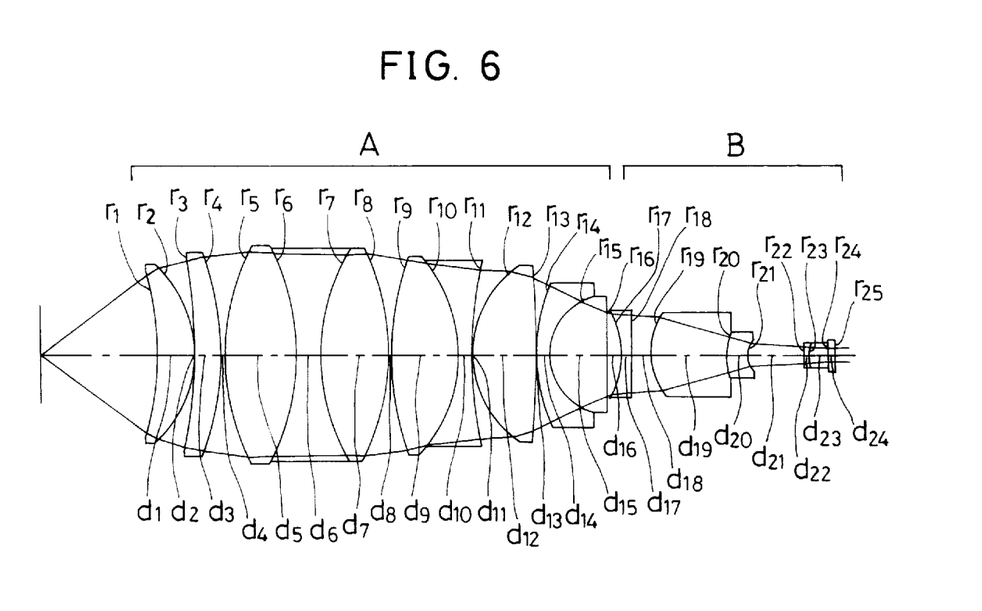
FIG. 6 is a sectional schematic of Example 6 of the microscope object according to the invention.
Figure 7:
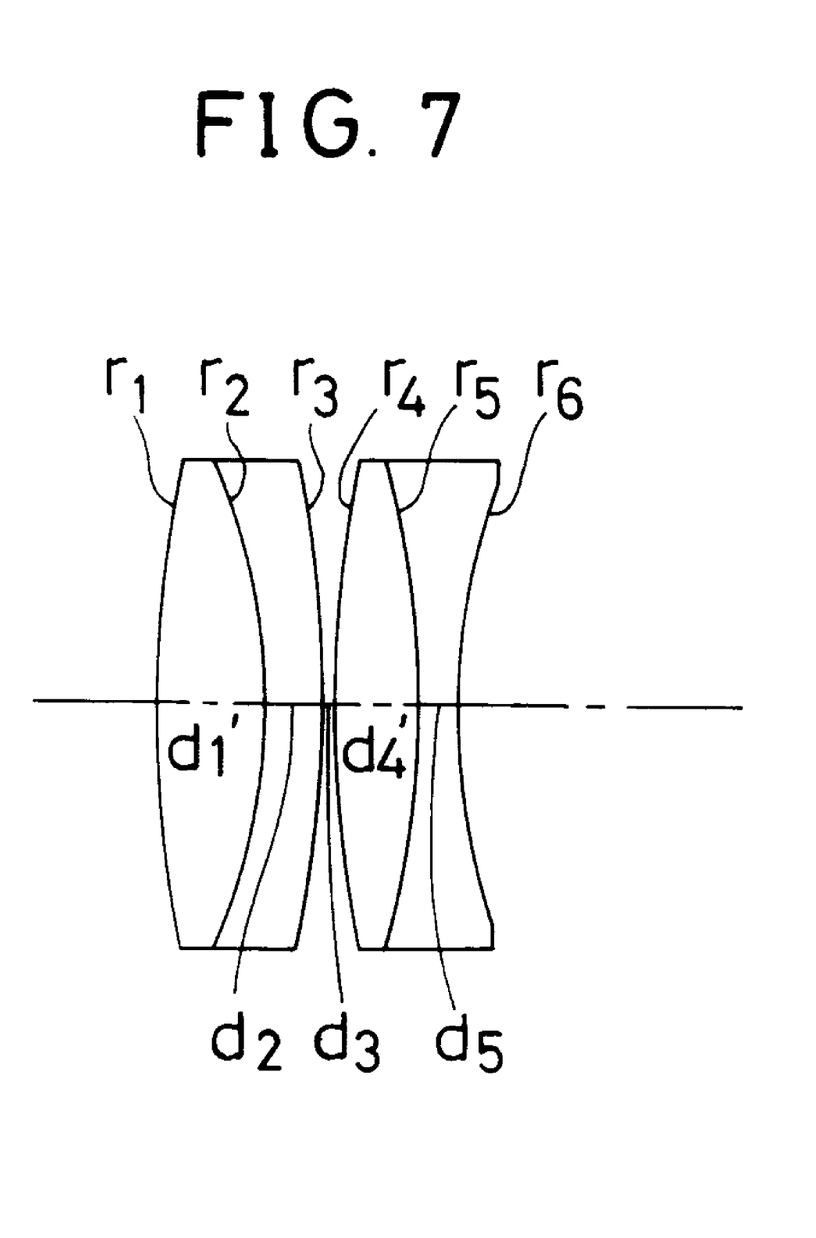
FIG. 7 is a sectional schematic of one embodiment of the image forming lens used with each example of the microscope objective according to the invention.

Examples 1 to 6 are all directed to an infinity correction type objective wherein light leaving the objective takes the form of a parallel light beam. No image is formed by used of the objective alone. The objective should be used in combination with an image forming lens having such lens data as mentioned below and shown in section in FIG. 7. In the lens data given below, symbols have the following meanings:

$r_1'$, $r_2'$ . . . radius of curvature of each lens surface as viewed in order from the object side $d_1'$, $d_2'$ . . . separation between adjacent lens surfaces as viewed in order from the object side $n_{d1}'$, $n_{d2}'$ . . . d-line refractive index of each lens as viewed in order from the object side $v_{d1}'$, $v_{d2}'$ . . . Abbe's number of each lens as viewed in order from the object side

| $r_1'$ = 68.754 | $d_1'$ = 7.732 | $n_{d1}'$ = 1.487 | $v_{d1}'$ = 70.2 |
|---|---|---|---|
| $r_2'$ = −37.567 | $d_2'$ = 3.474 | $n_{d2}'$ = 1.806 | $v_{d2}'$ = 40.9 |
| $r_3'$ = −102.847 | $d_3'$ = 0.697 | | |
| $r_4'$ = 84.309 | $d_4'$ = 6.023 | $n_{d3}'$ = 1.834 | $v_{d3}'$ = 37.1 |
| $r_5'$ = −50.710 | $d_5'$ = 3.029 | $n_{d4}'$ = 1.644 | $v_{d4}'$ = 40.8 |
| $r_6'$ = 40.661 | | | |

In this case, the distance between the objectives of Examples 1 to 6 and the image forming lens of FIG. 7 may be somewhere between 50 mm and 170 mm.

As can be understood from the foregoing, the long working distance objective according to the invention has a working distance longer than achieved so far in the prior even at more than 100X magnification and has an excellent ability to form images, and so is well suitable for use with industrial microscopes and biological microscopes.

What we claim is:

1. An objective having a long working distance, comprising, in order from an object;

a lens group A that comprises a positive meniscus lens concave toward an object side thereof and a plurality of cemented lenses said lens group A having a positive refractive power and converting light rays from said object to a converging light beam; and a lens group B having negative refractive power, wherein said objective satisfies condition (1) given below:

$$5 < |f_A/f_B| < 20 \quad (1)$$

where $f_A$ is a focal length of said lens group A and $f_B$ is a focal length of said lens group B.

2. An objective having a long working distance according to claim 1, which further satisfies condition (1)' given below:

$$7 < |f_A/f_B| < 19 \quad (1)'$$

3. An objective having a long working distance according to claim 1, which further satisfies condition (2) given below:

$$7 < |r_1/(n_1-1)|/f \quad (2)$$

where $r_1$ is an object-side radius of curvature of a positive meniscus lens in said lens group A that is located nearest to the object side, $n_1$ is a refractive index of said positive meniscus lens, and f is a focal length of said objective.

4. A measuring microscope which is combined with an objective having a long working distance as recited in claim 3.

5. A semiconductor inspector which is combined with an objective having a long working distance as recited in claim 3.

6. An objective having a long working distance according to claim 1, wherein said lens group A further comprises at least two positive single meniscus lenses, each concave toward the object side.

7. An objective having a long working distance according to claim 1, wherein said lens group A further comprises a triplet comprising a convex lens, a concave lens and a convex lens.

8. An objective having a long working distance according to claim 7, wherein said triplet satisfies condition (3) given below:

$$\nu_T - \nu_O > 25 \tag{3}$$

where $\nu_T$ is an average Abbe's number of the convex lenses in said triplet, and $\nu_O$ is an Abbe's number of the concave lens in said triplet.

9. An objective having a long working distance according to claim 1, wherein said lens group B further comprises a cemented lens located nearest to the object side, comprising a triplet comprising a concave lens, a convex lens and a concave lens.

10. An objective having a long working distance according to claim 1, which comprises at least three triplets.

11. A measuring microscope which is combined with an objective having a long working distance as recited in claim 1.

12. A semiconductor inspector which is combined with an objective having a long working distance as recited in claim 1.

13. An objective having a long working distance, which comprises, in order from an object side thereof;

a first lens group that comprises a positive meniscus lens concave toward the object side and a plurality of cemented lenses, has positive refractive power and converts light rays from an object to a converging light beam;

a second lens group having negative refractive power and comprising a triplet comprising a concave lens, a convex lens and a concave lens;

and a third lens group having negative refractive power, wherein said objective satisfies condition (2) given below:

$$7 < |r_1/(n_1-1)|/f \tag{2}$$

where $r_1$ is an object-side radius of curvature of a positive meniscus lens in said first lens group that is located nearest to said object side, $n_1$ is a refractive index of said positive meniscus lens, and f is a focal length of said objective.

14. An objective having a long working distance according to claim 13, wherein said first lens group further comprises at least two positive single meniscus lenses, each concave toward the object side.

15. A measuring microscope which is combined with an objective having a long working distance as recited in claim 14.

16. A semiconductor inspector which is combined with an objective having a long working distance as recited in claim 14.

17. An objective having a long working distance according to claim 13, wherein said first lens group further comprises a triplet comprising a convex lens, a concave lens and a convex lens.

18. An objective having a long working distance according to claim 17, wherein said triplet in said first lens group satisfies condition (3) given below:

$$\nu_T - \nu_0 > 25 \tag{3}$$

wherein $\nu_T$ is an average Abbe's number of the convex lenses in said triplet, and $\nu_O$ is an Abbe's number of the concave lens in said triplet.

19. An objective having a long working distance according to claim 13, wherein said triplet satisfies condition (4) given below:

$$\nu_{T2} - \nu_{O2} > 35 \tag{4}$$

where $\nu_{T2}$ is an Abbe's number of the convex lens in said triplet, and $\nu_{O2}$ is an Abbe's number of the concave lens in said triplet that is located on the object side.

20. An objective having a long working distance according to claim 13, wherein a cemented meniscus lens convex toward the object side is located nearest to the object side of said third lens group.

21. A measuring microscope which is combined with an objective having a long working distance as recited in claim 13.

22. A semiconductor inspector which is combined with an objective having a long working distance as recited in claim 13.

* * * * *